(12) United States Patent
Arai et al.

(10) Patent No.: US 8,738,267 B2
(45) Date of Patent: May 27, 2014

(54) VEHICULAR TRAVEL CONTROL DEVICE

(75) Inventors: Toshiaki Arai, Utsunomiya (JP); Tadayoshi Okada, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 513 days.

(21) Appl. No.: 12/761,815

(22) Filed: Apr. 16, 2010

(65) Prior Publication Data
US 2010/0268432 A1   Oct. 21, 2010

(30) Foreign Application Priority Data

Apr. 21, 2009   (JP) ................................. 2009-103074

(51) Int. Cl.
*G06F 7/00*   (2006.01)
(52) U.S. Cl.
USPC .......................................................... 701/96
(58) Field of Classification Search
USPC .......................................................... 701/96
See application file for complete search history.

(56) References Cited

U.S. PATENT DOCUMENTS

| | | | | |
|---|---|---|---|---|
| 2002/0161506 | A1* | 10/2002 | Ishizu et al. | 701/96 |
| 2003/0234127 | A1* | 12/2003 | Sudou et al. | 180/170 |
| 2006/0100769 | A1* | 5/2006 | Arai et al. | 701/96 |

FOREIGN PATENT DOCUMENTS

| | | |
|---|---|---|
| JP | 05-294170 | 11/1993 |
| JP | 2001-328455 | 11/2001 |
| JP | 2003-291686 | 10/2003 |
| JP | 2005-247197 | 9/2005 |
| JP | 2007-137148 | 6/2007 |
| JP | 2007-145201 | 6/2007 |
| JP | 2009-040414 | 2/2009 |

* cited by examiner

*Primary Examiner* — Maceeh Anwari
(74) *Attorney, Agent, or Firm* — Rankin, Hill & Clark LLP (57) ABSTRACT

A vehicular travel control device according to the invention includes an inter-vehicle distance measuring section that is mounted on a subject vehicle and measures an inter-vehicle distance between the subject vehicle and a preceding vehicle, a target inter-vehicle distance setting section that sets a target inter-vehicle distance, a following travel control section that performs a travel control so as to make the inter-vehicle distance become equal to the target inter-vehicle distance and stops the subject vehicle while following a stopping of the preceding vehicle, a gradient acquiring section that acquires a gradient of a road being traveled of the subject vehicle, and a vehicle speed sensor that measures a travel speed of the subject vehicle. The target inter-vehicle distance setting section sets the target inter-vehicle distance based on the gradient and the travel speed.

6 Claims, 11 Drawing Sheets

VEHICULAR TRAVEL CONTROL DEVICE

Priority is claimed on Japanese Patent Application No. 2009-103074, filed on Apr. 21, 2009, the contents of which are incorporated herein by reference.

BACKGROUND OF THE INVENTION

1. Field of the Invention

The present invention relates to a vehicular travel control device.

2. Description of the Related Art

In the past, there is a known, for example, a following travel control device that stops and moves a subject vehicle according to changes in the travel state including the stopping and moving of a preceding vehicle (for example, see Japanese Patent No. 4230385).

When this kind of following travel control device performs a control for stopping the subject vehicle while following a preceding vehicle, the vehicle is stopped so that a predetermined initial target inter-vehicle distance is equal to the inter-vehicle distance between the preceding vehicle and the subject vehicle at the time of stopping. In addition, if an instruction is made in a stop state so as to decrease the inter-vehicle distance between the preceding vehicle and the subject vehicle at the time of stopping by the input operation from the driver, the inter-vehicle distance is decreased up to the predetermined shortest target distance at the time of stopping.

Meanwhile, in the following travel control device according to the related art, a predetermined inter-vehicle distance at the time of stopping is secured between the preceding vehicle and the subject vehicle, regardless of the gradient of the road being traveled of the preceding vehicle and the subject vehicle. For this reason, the inter-vehicle distance at the time of stopping may cause the driver to feel uneasy. That is, when a stopped preceding vehicle starts on an uphill road, there is a concern that the preceding vehicle may move backward. Further, when the subject vehicle is to be stopped on a downhill road, there is a concern that there is insufficient deceleration. For this reason, if the same inter-vehicle distance at the time of stopping as that in the case of a flat road is set in the case of an uphill road or downhill road, a driver of the subject vehicle is apt to feel that the inter-vehicle distance is excessively short at the time of stopping. As a result, there is a possibility in that the driver of the subject vehicle feels uneasy due to the following travel control.

The present invention was made to solve the problem and an object thereof is to provide a vehicular travel control device that can prevent a driver from feeling uneasy from following travel control.

SUMMARY OF THE INVENTION

The present invention adopts the followings in order to solve the problem and thus achieve the associated object. That is:

(1) A vehicular travel control device according to the present invention includes an inter-vehicle distance measuring section that is mounted on a subject vehicle and measures an inter-vehicle distance between the subject vehicle and a preceding vehicle, a target inter-vehicle distance setting section that sets a target inter-vehicle distance, a following travel control section that performs a travel control so as to make the inter-vehicle distance become equal to the target inter-vehicle distance and stops the subject vehicle while following a stopping of the preceding vehicle, a gradient acquiring section that acquires a gradient of a road being traveled of the subject vehicle, and a vehicle speed sensor that measures a travel speed of the subject vehicle. The target inter-vehicle distance setting section sets the target inter-vehicle distance based on the gradient and the travel speed.

With the vehicular travel control device according to (1) above, a target inter-vehicle distance between the preceding vehicle and the subject vehicle is set in accordance with the travel speed of the subject vehicle and the gradient of the road of travel. Accordingly, it may be possible to appropriately set a target inter-vehicle distance in accordance with the driver's sense about the inter-vehicle distance that changes due to the gradient of the road of travel, so that it may be possible to prevent the driver from feeling uneasy due to the following travel control.

(2) In the vehicular travel control device according to (1) above, the target inter-vehicle distance setting section may set the target inter-vehicle distance so that the target inter-vehicle distance is increased in proportion to the gradient.

With the vehicular travel control device according to (2) above, as the gradient increases, the target inter-vehicle distance is increased in accordance with the driver's sense that have a tendency to increase due to the increase of the gradient. Therefore, even though a vehicle travels on a road surface of which the gradient is changed, it may be possible to prevent a driver from feeling uneasy due to the following travel control.

(3) The vehicular travel control device according to (1) above may further include an input section that receives an input operation of an operator, and an inter-vehicle distance setting section that sets a set value of an inter-vehicle distance based on the input operation. The target inter-vehicle distance setting section may set the target inter-vehicle distance based on the gradient, the travel speed, and the set value.

With the vehicular travel control device according to (3) above, a target inter-vehicle distance is set based on the set value of an inter-vehicle distance, which is set by an operator, in addition to the travel speed of the subject vehicle and the gradient of the road of travel. Accordingly, it may be possible to make the target inter-vehicle distance appropriately reflect the change in the driver's sense about the inter-vehicle distance, and to prevent the driver from feeling uneasy due to the following travel control.

(4) In the vehicular travel control device according to (3) above, the target inter-vehicle distance setting section may set weightings for a predetermined first inter-vehicle distance and a predetermined second inter-vehicle distance that is shorter than the first inter-vehicle distance, based on the gradient, and set the target inter-vehicle distance in accordance with the weightings.

With the vehicular travel control device according to (4) above, it may be possible to set the target inter-vehicle distance that continuously changes between the first inter-vehicle distance and the second inter-vehicle distance, and to appropriately set a target inter-vehicle distance in a range where the driver does not feel uneasy, in accordance with the driver's sense about the inter-vehicle distance that changes due to the gradient of the road of travel.

(5) The vehicular travel control device according to (3) above may further include an inter-vehicle distance correcting section that sets a correction amount of an inter-vehicle distance, and the target inter-vehicle distance setting section may set a value, which is obtained by adding the correction amount of an inter-vehicle distance to the set value, as the target inter-vehicle distance.

With the vehicular travel control device according to (5) above, it may be possible to appropriately set a target inter-vehicle distance in accordance with the driver's sense about an inter-vehicle distance that changes due to the gradient of the road of travel.

(6) In the vehicular travel control device according to (5) above, the inter-vehicle distance correcting section may set the correction amount of the inter-vehicle distance based on the gradient and the travel speed.

With the vehicular travel control device according to (6) above, it may be possible to appropriately set a target inter-vehicle distance in accordance with the driver's sense about an inter-vehicle distance that changes due to the vehicle speed, in addition to the gradient of the road of travel.

(7) A vehicular travel control method according to the present invention includes the steps of: measuring an inter-vehicle distance between a subject vehicle and a preceding vehicle; measuring a travel speed of the subject vehicle; acquiring a gradient of a road being traveled of the subject vehicle; setting a target inter-vehicle distance based on the gradient and the travel speed; and performing a travel control so as to make the inter-vehicle distance become equal to the target inter-vehicle distance and stop the subject vehicle while following a stopping of the preceding vehicle.

With the vehicular travel control method according to (7) above, a target inter-vehicle distance between the preceding vehicle and the subject vehicle is set in accordance with the travel speed of the subject vehicle and the gradient of the road of travel. Accordingly, it may be possible to appropriately set a target inter-vehicle distance in accordance with the driver's sense about the inter-vehicle distance that changes due to the gradient of the road of travel, so that it may be possible to prevent the driver from feeling uneasy due to the following travel control.

(8) In the vehicular travel control method according to (7) above, it may be arranged such that, in the step of setting the target inter-vehicle distance, the target inter-vehicle distance is set so as to be increased in proportion to the gradient.

With the vehicular travel control method according to (8) above, as the gradient increases, the target inter-vehicle distance is increased in accordance with the driver's sense that have a tendency to increase due to the increase of the gradient. Therefore, even though a vehicle travels on a road surface of which the gradient is changed, it may be possible to prevent a driver from feeling uneasy due to the following travel control.

(9) In the vehicular travel control method according to (7) above, it may be arranged such that: the vehicular travel control method is further provided with the steps of receiving an input operation of an operator, and setting a set value of an inter-vehicle distance based on the input operation; and in the step of setting the target inter-vehicle distance, the target inter-vehicle distance is set based on the gradient, the travel speed, and the set value.

With the vehicular travel control method according to (9) above, a target inter-vehicle distance is set based on the set value of an inter-vehicle distance, which is set by an operator, in addition to the travel speed of the subject vehicle and the gradient of the road of travel. Accordingly, it may be possible to make the target inter-vehicle distance appropriately reflect the change in the driver's sense about the inter-vehicle distance, and to prevent the driver from feeling uneasy due to the following travel control.

(10) In the vehicular travel control method according to (9) above, it may be arranged such: that the vehicular travel control method is further provided with the step of setting weightings for a predetermined first inter-vehicle distance and a predetermined second inter-vehicle distance that is shorter than the first inter-vehicle distance, based on the gradient; and in the step of setting the target inter-vehicle distance, the target inter-vehicle distance is set in accordance with the weightings.

With the vehicular travel control method according to (10) above, it may be possible to set the target inter-vehicle distance that continuously changes between the first inter-vehicle distance and the second inter-vehicle distance, and to appropriately set a target inter-vehicle distance in a range where the driver does not feel uneasy, in accordance with the driver's sense about the inter-vehicle distance that changes due to the gradient of the road of travel.

(11) In the vehicular travel control method according to (9) above, it may be arranged such that: the vehicular travel control method is further provided with the step of setting a correction amount of an inter-vehicle distance; and in the step of setting the target inter-vehicle distance, the target inter-vehicle distance is set by adding the correction amount to the set value.

With the vehicular travel control method according to (11) above, it may be possible to appropriately set a target inter-vehicle distance in accordance with the driver's sense about an inter-vehicle distance that changes due to the gradient of the road of travel.

(12) In the vehicular travel control method according to (11) above, it may be arranged such that, in the step of setting the correction amount, the correction amount is set based on the gradient and the travel speed.

With the vehicular travel control method according to (12) above, it may be possible to appropriately set a target inter-vehicle distance in accordance with the driver's sense about an inter-vehicle distance that changes due to the vehicle speed, in addition to the gradient of the road of travel.

DETAILED DESCRIPTION OF THE INVENTION

Hereinafter, an embodiment of the present invention will be described below with reference to drawings.

Figure 1:
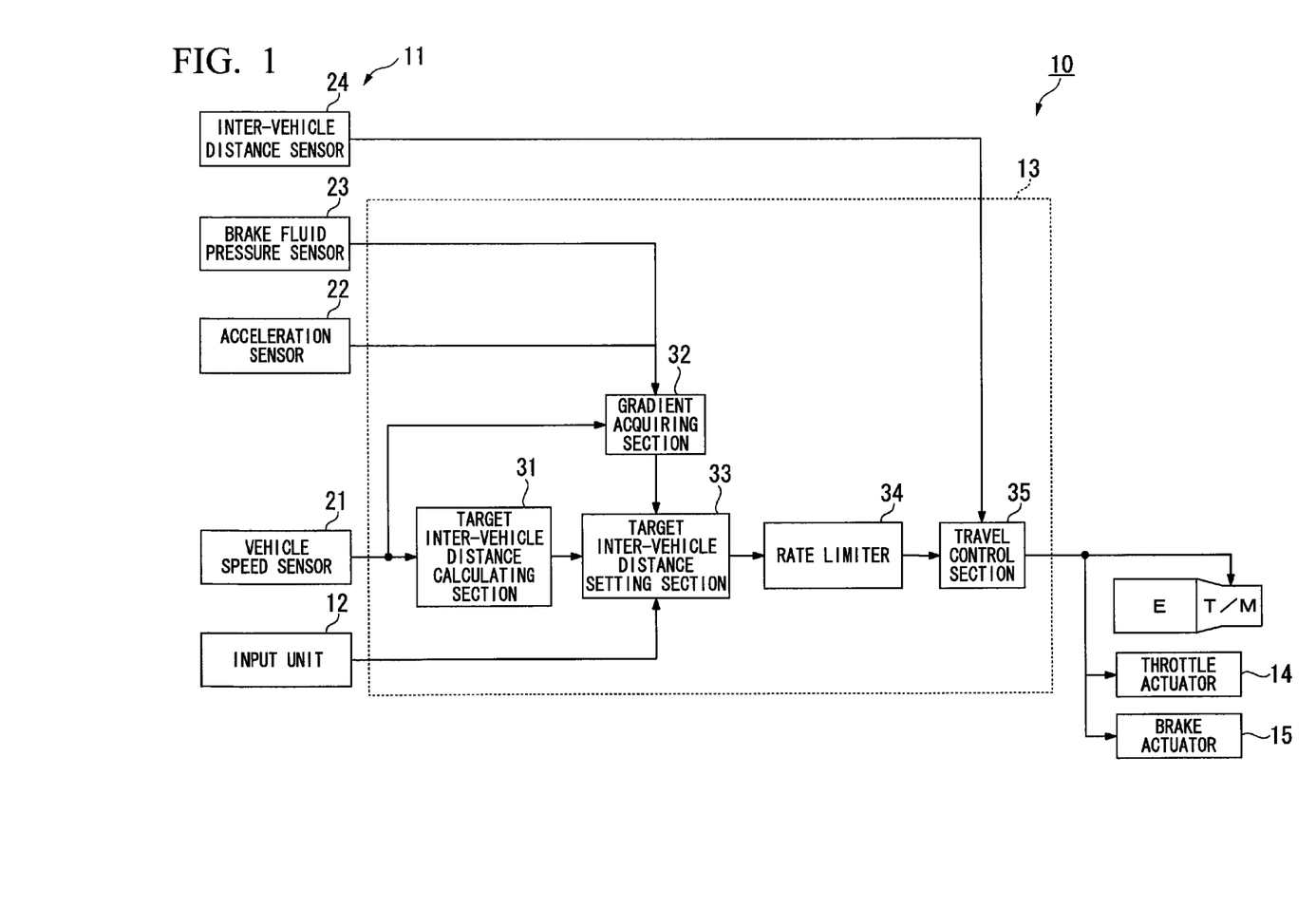
FIG. 1 is a block diagram of a vehicular travel control device according to an embodiment of the present invention.

For example, as shown in FIG. 1, a vehicular travel control device 10 according to this embodiment is mounted on a vehicle that transmits the driving force of an internal combustion engine E to driving wheels (not shown) through a transmission T/M. The vehicular travel control device includes vehicle state sensors 11, an input unit 12, a control unit 13, a throttle actuator 14, and a brake actuator 15.

For example, the vehicle state sensors 11 include a vehicle speed sensor 21 that measures the speed of the subject vehicle (vehicle speed), an acceleration sensor 22 that measures acceleration acting in a longitudinal direction of a vehicle body, a brake fluid pressure sensor 23 that measures brake fluid pressure, an inter-vehicle distance sensor 24, or the like. The vehicle state sensors 11 outputs signals of measurement results of various kinds of vehicle information about the subject vehicle. The inter-vehicle distance sensor 24 measures, by a radar (not shown) or the like, the inter-vehicle distance between the subject vehicle and another vehicle (for example, a preceding vehicle or the like) that exists on the front side of the subject vehicle.

The control unit 13 controls the travel state of the subject vehicle, for example, the traveling and stopping of the subject vehicle following a preceding vehicle based on the measurement results of various kinds of vehicle information output from the vehicle state sensors 11.

The control unit 13 includes, for example, a target inter-vehicle distance calculating section 31, a gradient acquiring section 32, a target inter-vehicle distance setting section 33, a rate limiter 34, and a travel control section 35.

The target inter-vehicle distance calculating section 31 calculates target inter-vehicle distances (that is, target values of inter-vehicle distances between the preceding vehicle and the subject vehicle) for a plurality of target inter-vehicle distance characteristics with reference to a predetermined map that has a plurality of preset target inter-vehicle distance characteristics based on the measurement results of the vehicle speed output from the vehicle speed sensor 21.

Figure 2:
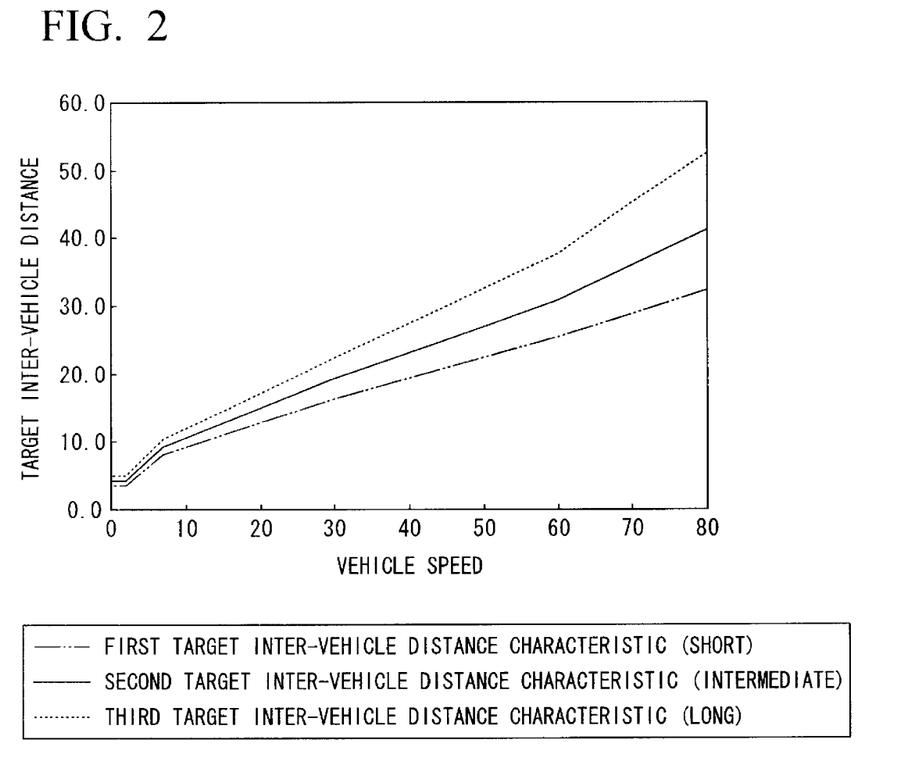
FIG. 2 is a graph showing a relationship between target inter-vehicle distances and vehicle speeds for a plurality of target inter-vehicle distance characteristics of the embodiment.

For example, as shown in FIG. 2, the predetermined map sets the change of the target inter-vehicle distances corresponding to the vehicle speeds for the plurality of target inter-vehicle distance characteristics (for example, first to third target inter-vehicle distance characteristics). Each of the target inter-vehicle distance characteristics is set in the map so that the target inter-vehicle distance is changed to have a tendency to increase as the vehicle speed increases.

The gradient acquiring section 32 acquires the gradient of the road of travel, for example, based on the measurement results of the vehicle speed output from the vehicle speed sensor 21, the measurement results of the acceleration output from the acceleration sensor 22, the measurement results of the brake fluid pressure output from the brake fluid pressure sensor 23, or the like.

Figure 3:
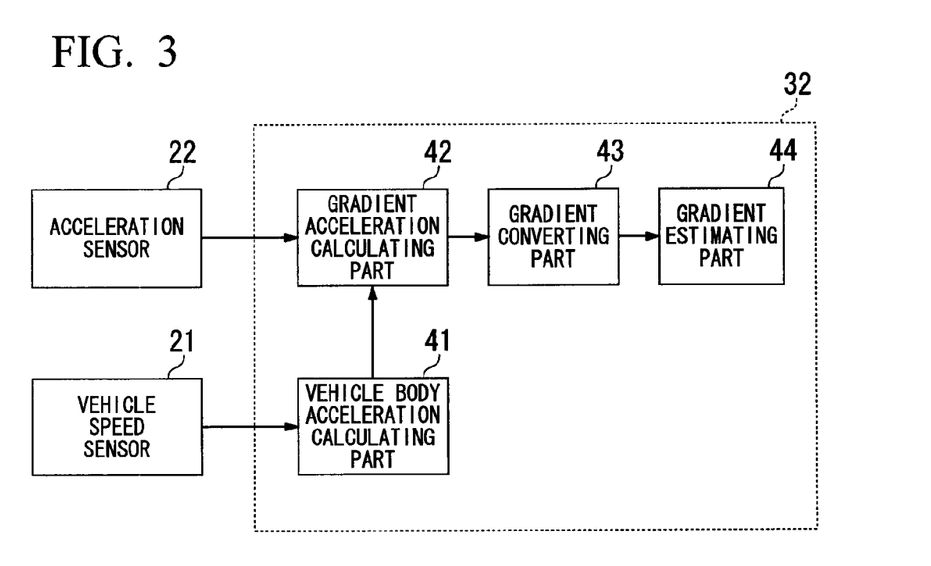
FIG. 3 is a block diagram of a gradient acquiring section of the embodiment.

If acquiring a gradient from the measurement results of, for example, vehicle speed and acceleration, the gradient acquiring section 32 includes a vehicle body acceleration calculating part 41, a gradient acceleration calculating part 42, a gradient converting part 43, and a gradient estimating part 44, as shown in FIG. 3.

The vehicle body acceleration calculating part 41 calculates the change of the vehicle speed per unit time based on the measurement results of the vehicle speed output from the vehicle speed sensor 21, and outputs the calculation result as vehicle body acceleration.

The gradient acceleration calculating part 42 calculates acceleration (gradient acceleration), which corresponds to the gradient of the road of travel and is caused by the contribution of acceleration of gravity, by subtracting the vehicle body acceleration, which is calculated by the vehicle body acceleration calculating part 41, from the acceleration that is measured by the acceleration sensor 22 and acts in the longitudinal direction of the vehicle body.

The gradient converting part 43 converts the gradient acceleration into a gradient conversion value by applying a predetermined conversion coefficient to the gradient acceleration that is calculated by the gradient acceleration calculating part 42.

The gradient estimating part 44 estimates the gradient of the road of travel based on the gradient conversion value that is calculated by the gradient converting part 43.

For example, as shown in Table 1, the gradient estimating part 44 acquires a slope level corresponding to the gradient conversion value, which is calculated by the gradient converting part 43, with reference to a predetermined map or the like. The slope level is set according to the gradients of an uphill road and a downhill road. A positive value of the slope level represents the magnitude of a rising gradient, and a negative value of the slope level represents the magnitude of a falling gradient. The slope level is set so that the magnitude of the gradient is changed to have a tendency to increase as the absolute value of the slope level increases.

TABLE 1

| gradient conversion value (absolute value) | slope level |
| --- | --- |
| Ga % or more | ±2 |
| Gb % or more and less than Ga % | ±1 |
| less than Gb % | 0 |

(Ga > Gb)

For example, if the absolute value of the gradient conversion value is greater than or equal to a predetermined first gradient value Ga % (for example, 12%), the slope level is ±2 in a predetermined map shown in Table 1. Meanwhile, the slope level of the uphill road corresponds to "+" and the slope level of the downhill road corresponds to "−". Further, if the absolute value of the gradient conversion value is greater than or equal to a predetermined second gradient value Gb % (for example, 6%) (which is less than the first gradient value Ga %) and is less than the predetermined first gradient value Ga %, the slope level is ±1. Furthermore, if the absolute value of the gradient conversion value is less than the predetermined second gradient value Gb %, the slope level is zero.

Figure 4:
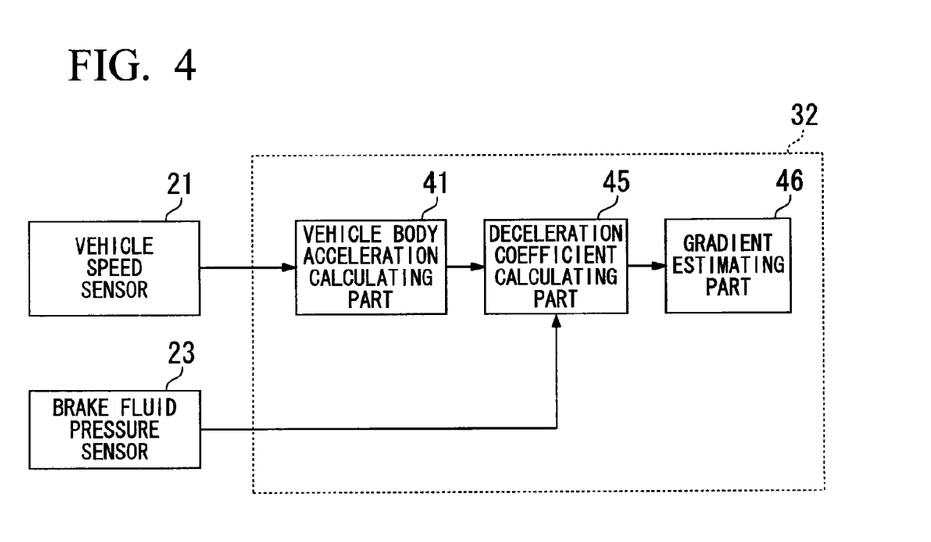
FIG. 4 is a block diagram of the gradient acquiring section of the embodiment.

Moreover, if acquiring the gradient from the measurement results of, for example, a vehicle speed and brake fluid pressure, the gradient acquiring section 32 includes a vehicle body acceleration calculating part 41, a deceleration coefficient calculating part 45, and a gradient estimating part 46 as shown in FIG. 4.

The deceleration coefficient calculating part 45 calculates deceleration, which is caused by the operation of the brake, for example, by subtracting the contribution of deceleration (engine load deceleration) that is generated at the vehicle body by an operation load of the internal combustion engine E and acceleration that is generated by creep torque caused by a mechanism of the transmission T/M, from the vehicle body acceleration calculated by the vehicle body acceleration calculating part 41. Further, the deceleration coefficient calculating part 45 calculates an average of a ratio between brake fluid pressure and the deceleration caused by the operation of a brake, and outputs this calculation result as a hydraulic deceleration coefficient.

Figure 5:
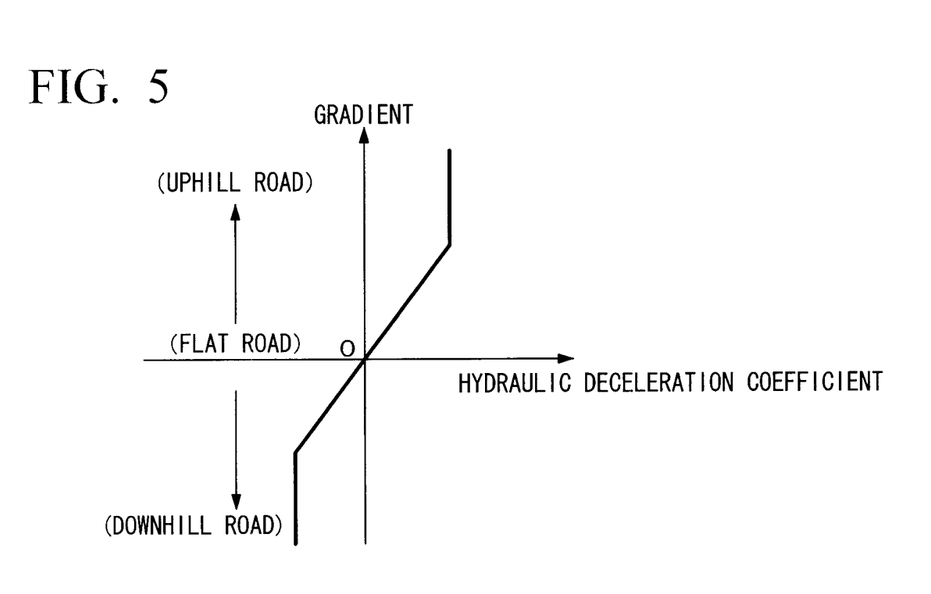
FIG. 5 is a graph showing a relationship between a gradient and a hydraulic deceleration coefficient of the embodiment.

The gradient estimating part 46 estimates the gradient of the road of travel based on the hydraulic deceleration coefficient that is calculated by the deceleration coefficient calculating part 44. For example, as shown in FIG. 5, in a range where the absolute value of the hydraulic deceleration coefficient is less than or equal to a predetermined threshold value, the hydraulic deceleration coefficient is set so that the gradient is changed to have a tendency to increase with the increase of the hydraulic deceleration coefficient.

For example, the gradient estimating part 46 acquires a slope level corresponding to the hydraulic deceleration coefficient, which is calculated by the deceleration coefficient calculating part 44, with reference to a predetermined map.

For example, if the absolute value of the hydraulic deceleration coefficient is greater than or equal to a predetermined first threshold value THa, the slope level is ±2 in the predetermined map. Further, if the absolute value of the hydraulic deceleration coefficient is greater than or equal to a second threshold value THb (which is less than the first threshold value THa) and is less than the predetermined first threshold value THa, the slope level is ±1. Furthermore, if the absolute value of the hydraulic deceleration coefficient is less than the predetermined second threshold value THb, the slope level is zero.

The target inter-vehicle distance setting section 33 sets a target inter-vehicle distance based on the gradient (that is, slope level) that is acquired by the gradient acquiring section 32, the target inter-vehicle distances for the plurality of target inter-vehicle distance characteristics which are calculated by the target inter-vehicle distance calculating section 31 (for example, a short set value DS corresponding to the first target inter-vehicle distance characteristic, an intermediate set value DM corresponding to the second target inter-vehicle distance characteristic, and a long set value DL corresponding to the third target inter-vehicle distance characteristic), and a selection instruction for the target inter-vehicle distance that is output from the input unit 12 in accordance with an input operation of an operator.

For example, as shown in the following Table 2, the target inter-vehicle distance setting section 33 sets the shortest inter-vehicle distance from the target inter-vehicle distances for the plurality of target inter-vehicle distance characteristics, which is calculated by the target inter-vehicle distance calculating section 31, in accordance with the gradients (that is, slope level) that are acquired by the gradient acquiring section 32. For example, if the slope level is ±2, the long set value DL corresponding to the third target inter-vehicle distance characteristic, which is the maximum target inter-vehicle distance in the plural target inter-vehicle distance characteristics, is set as the shortest inter-vehicle distance. Further, if the slope level is ±1, the intermediate set value DM (<the long set value DL) corresponding to the second target inter-vehicle distance characteristic, which is the second largest target inter-vehicle distance in the plural target inter-vehicle distance characteristics, is set as the shortest inter-vehicle distance. Furthermore, if the slope level is zero, the shortest inter-vehicle distance is not limited.

Meanwhile, the shortest inter-vehicle distance corresponding to each of the slope levels may be set to a distance that is longer than the target inter-vehicle distance obtained from each of the target inter-vehicle distance characteristics by a predetermined value α.

TABLE 2

| slope level | shortest inter-vehicle distance |
|---|---|
| ±2 | long set value DL |
| ±1 | intermediate set value DM |
| 0 | not limited |

Further, if the vehicle speed measured by the vehicle speed sensor 21 is less than or equal to a predetermined determination threshold value (for example, 40 km/h) representing a low-speed travel state, the target inter-vehicle distance setting section 33 sets a target inter-vehicle distance in a range that is less than or equal to the shortest inter-vehicle distance corresponding to the slope level with reference to the selection instruction for the target inter-vehicle distance that is output from the input unit 12.

For example, if the target inter-vehicle distance, which is set with reference to the selection instruction of an operator, is shorter than the shortest inter-vehicle distance corresponding to the slope level, the shortest inter-vehicle distance is set as a target inter-vehicle distance. Meanwhile, if the target inter-vehicle distance, which is set with reference to the selection instruction of an operator, is longer than the shortest inter-vehicle distance corresponding to the slope level, the target inter-vehicle distance, which is set with reference to the selection instruction of an operator, is output as a target inter-vehicle distance. Further, if the shortest inter-vehicle distance is not limited, the target inter-vehicle distance, which is set with reference to the selection instruction of an operator, is output as a target inter-vehicle distance.

The rate limiter 34 limits a time rate of change of the target inter-vehicle distance in order to prevent the target inter-vehicle distance, which is set by the target inter-vehicle distance setting section 33, from rapidly changing above a predetermined time rate of change.

The travel control section 35 outputs a control signal for controlling the travel state of the subject vehicle (for example, the travel and stop of the subject vehicle following a preceding vehicle) so that the measurement result of the inter-vehicle distance becomes equal to the target inter-vehicle distance, based on the measurement result of the inter-vehicle distance, which is output from the inter-vehicle distance sensor 24, between the subject vehicle and another vehicle (for example, a preceding vehicle or the like) that is in front of the subject vehicle, and the target inter-vehicle distance output from the rate limiter 34. This control signal includes, for example, a control signal for controlling the shift operation of a transmission T/M, a control signal for controlling a driving force of the internal combustion engine E by the throttle actuator 14, a control signal for controlling the deceleration that is performed by the brake using the brake actuator 15, or the like.

The vehicular travel control device 10 according to this embodiment has the above-mentioned configuration. The operation of the vehicular travel control device 10 (particularly, processing for setting a target inter-vehicle distance) will be described below with reference to drawings.

Figure 6:
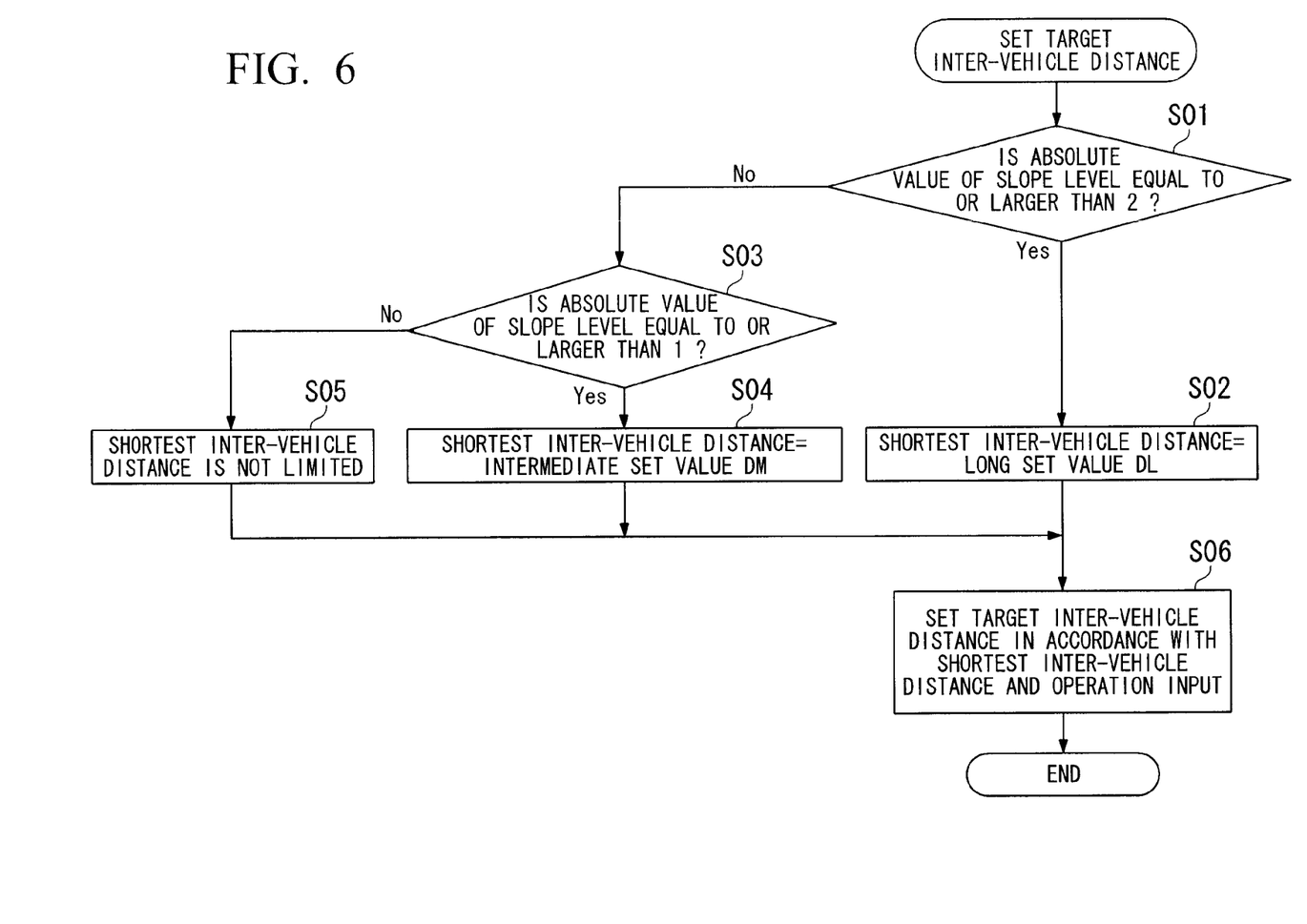
FIG. 6 is a flowchart illustrating an operation of the vehicular travel control device according to the embodiment, particularly, processing for setting a target inter-vehicle distance.

First, for example, it is determined in Step S01 illustrated in FIG. 6 whether the absolute value of the slope level is greater than or equal to 2.

If the result of this determination is to "YES", a procedure proceeds to Step S02. In Step S02, the long set value DL is set as the shortest inter-vehicle distance and the procedure proceeds to Step S06 to be described below.

Meanwhile, if the result of this determination is to "NO", the procedure proceeds to Step S03.

Then, it is determined in Step S03 whether the absolute value of the slope level is greater than or equal to 1.

If the result of this determination is to "YES", the procedure proceeds to Step S04. In Step S04, the intermediate set value DM is set as the shortest inter-vehicle distance and the procedure proceeds to Step S06 to be described below.

Meanwhile, if the result of this determination is to "NO", the procedure proceeds to Step S05. In Step S05, the shortest inter-vehicle distance is not limited and the procedure proceeds to Step S06.

Further, in Step S06, a target inter-vehicle distance is set in a range that is greater than or equal to the shortest inter-vehicle distance based on the shortest inter-vehicle distance and the operation input of an operator on the input unit 12 with reference to the operation input. Then, the procedure proceeds to an end.

As described above, according to the vehicular travel control device 10 of the embodiment of the present invention, a target inter-vehicle distance between a preceding vehicle and the subject vehicle is set in accordance with the speed of the subject vehicle and the gradient of the road of travel.

This process makes the target inter-vehicle distance change to have a tendency to increase as the inter-vehicle distance for preventing the driver from feeling uneasy increases with the increase of the gradient. Accordingly, it may be possible to appropriately set a target inter-vehicle distance according to the driver's sense about an inter-vehicle distance that is changed due to the gradient of the road of travel. Further, it may be possible to prevent the driver from feeling uneasy due to the following travel control including the travel and stop in a range where the vehicle speed is less than or equal to a predetermined determination threshold value representing a low-speed travel state.

Moreover, a target inter-vehicle distance is set based on the selection result for the target inter-vehicle distance, which corresponds to the operation input of an operator, in addition to the speed of the subject vehicle and the gradient of the road of travel. Accordingly, it may be possible to make a target inter-vehicle distance appropriately reflect the change of the driver's sense about an inter-vehicle distance.

Meanwhile, in the above-mentioned embodiment, the target inter-vehicle distance setting section 33 has set the shortest inter-vehicle distance in accordance with the slope level that is acquired by the gradient acquiring section 32. The present invention is not limited thereto. For example, as shown in the following Table 3, the shortest inter-vehicle distance may be set in accordance with a gradient without the use of a slope level.

TABLE 3

| gradient (absolute value) | shortest inter-vehicle distance |
|---|---|
| Ga % or more | long set value DL |
| Gb % or more and less than Ga % | intermediate set value DM |

TABLE 3-continued

| gradient (absolute value) | shortest inter-vehicle distance |
|---|---|
| less than Gb % | not limited |

(Ga > Gb)

In the first modification, the gradient acquiring section 32 outputs a gradient without using a slope level. For example, if a gradient is acquired from measurement results of acceleration and a vehicle speed, the gradient estimating part 44 shown in FIG. 3 is omitted and a gradient conversion value is output as a gradient. In this case, according to processing for setting a target inter-vehicle distance, first, for example, it is determined in Step S11 illustrated in FIG. 7 whether the absolute value of the gradient conversion value calculated by the gradient converting part 43 is greater than or equal to a predetermined first gradient value Ga % (for example, 12%).

Figure 7:
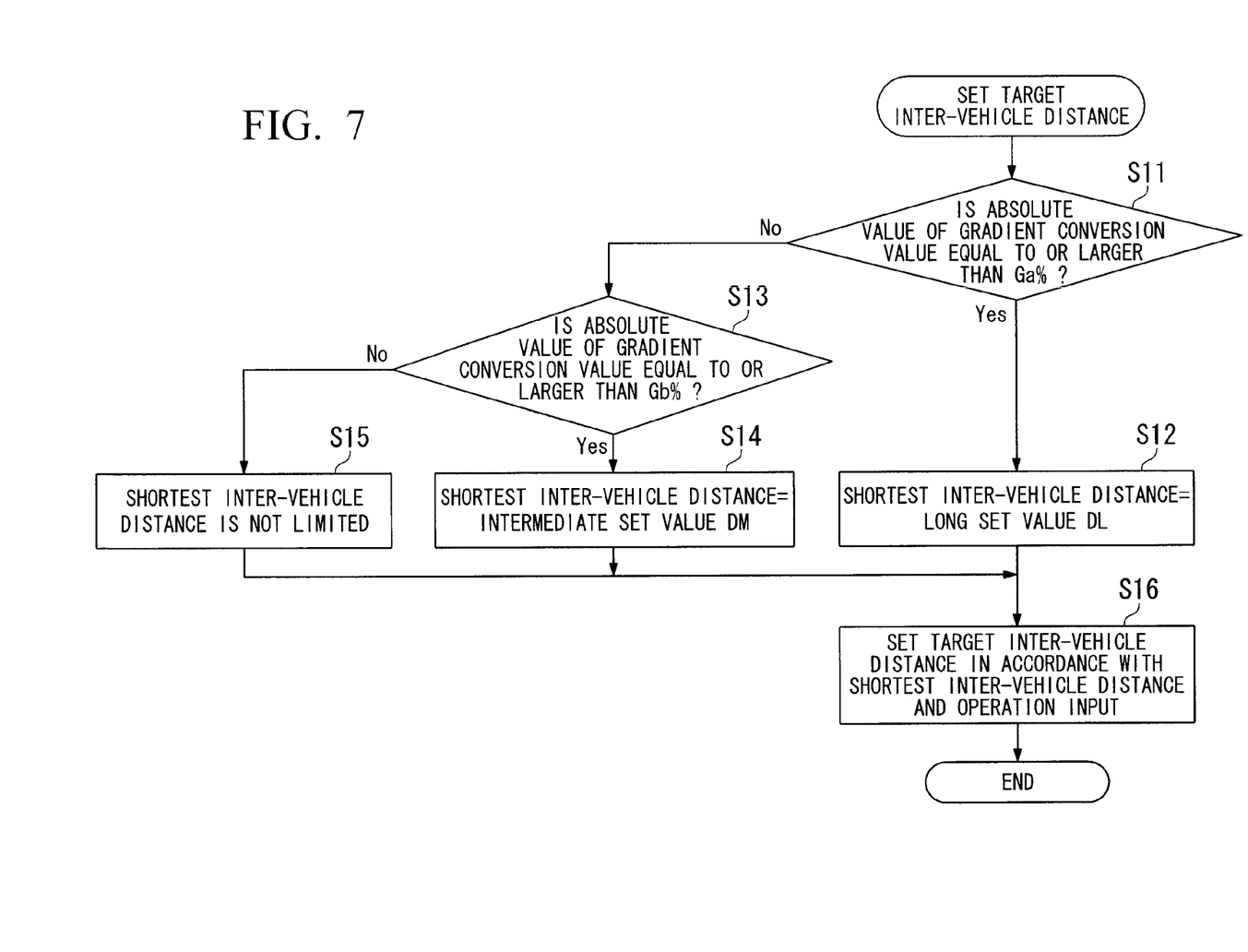
FIG. 7 is a flowchart illustrating an operation of a vehicular travel control device according to a first modification of the embodiment, particularly, processing for setting a target inter-vehicle distance.

If the result of this determination is to "YES", a procedure proceeds to Step S12. In Step S12, the long set value DL is set as the shortest inter-vehicle distance and the procedure proceeds to Step S16 to be described below.

Meanwhile, if the result of this determination is to "NO", the procedure proceeds to Step S13.

Then, it is determined in Step S13 whether the absolute value of the gradient conversion value is greater than or equal to a predetermined second gradient value Gb % (for example, 6%) (which is less than the first gradient value Ga %).

If the result of this determination is to "YES", the procedure proceeds to Step S14. In Step S14, the intermediate set value DM is set as the shortest inter-vehicle distance and the procedure proceeds to Step S16 to be described below.

Meanwhile, if the result of this determination is to "NO", the procedure proceeds to Step S15. In Step S15, the shortest inter-vehicle distance is not limited and the procedure proceeds to Step S16.

Further, in Step S16, a target inter-vehicle distance is set in a range that is greater than or equal to the shortest inter-vehicle distance based on the shortest inter-vehicle distance and the operation input of an operator on the input unit 12 with reference to the operation input. Then, the procedure proceeds to the end.

Furthermore, for example, if a gradient is acquired from measurement results of brake fluid pressure and a vehicle speed in the first modification, the gradient estimating part 46 shown in FIG. 4 acquires the gradient corresponding to the hydraulic deceleration coefficient, which is calculated by the deceleration coefficient calculating part 44, with reference to a predetermined map that represents a correspondence relationship between a preset hydraulic deceleration coefficient and a gradient as shown in, for example, FIG. 5.

Meanwhile, in the above-mentioned embodiment, any one of the target inter-vehicle distances for a plurality of target inter-vehicle distance characteristics, which are calculated by the target inter-vehicle distance calculating section 31, has been selected as the shortest inter-vehicle distance in accordance with the gradient. The present invention is not limited thereto. For example, as in a second modification shown in FIG. 8, a limit inter-vehicle distance, which continuously changes in accordance with a gradient, may be set from target inter-vehicle distances for a plurality of target inter-vehicle distance characteristics which are calculated by the target inter-vehicle distance calculating section 31.

Figure 8:
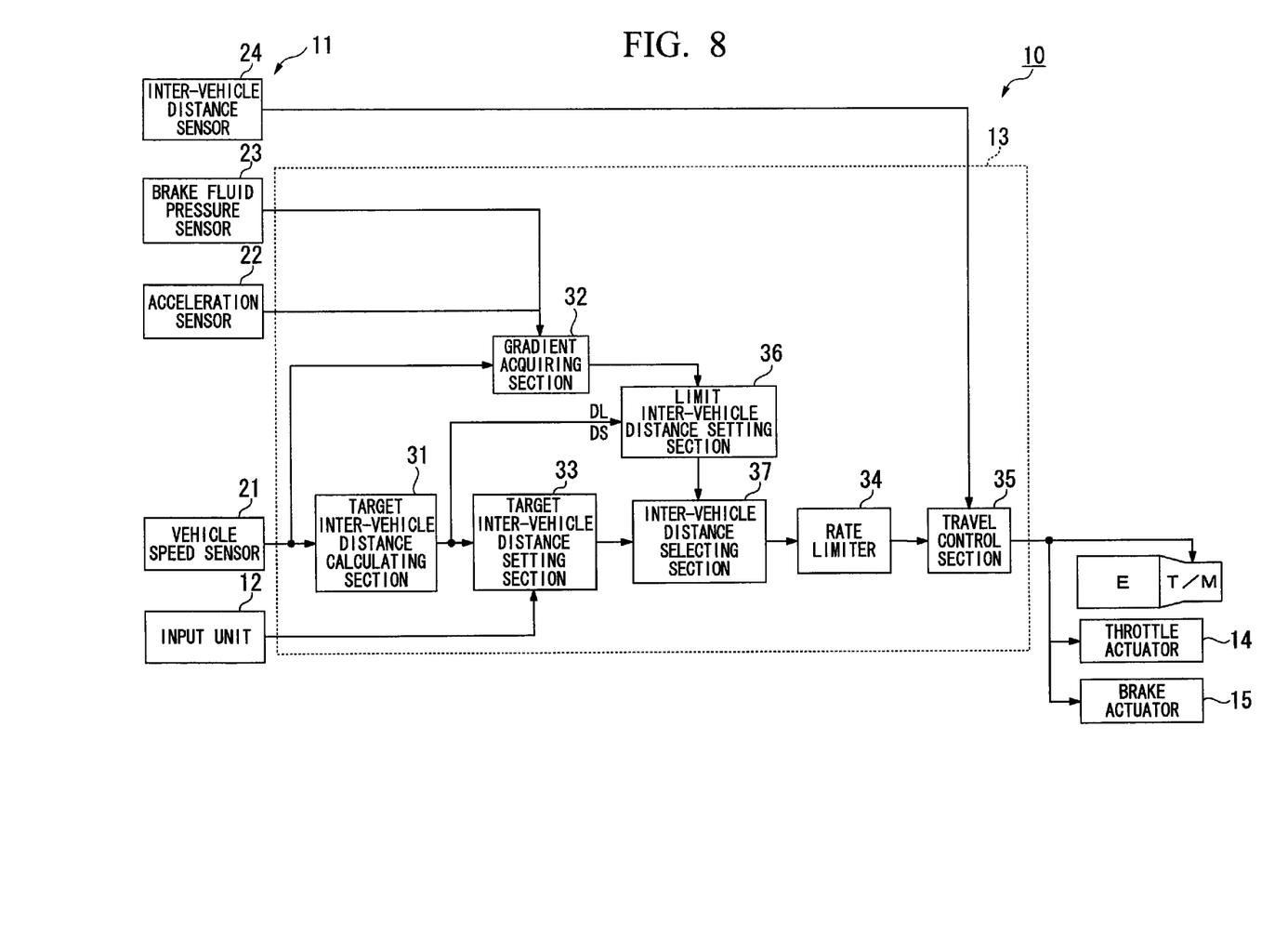
FIG. 8 is a block diagram of a vehicular travel control device according to a second modification of the embodiment.

In the second modification, the control unit 13 includes, for example, a target inter-vehicle distance calculating section 31, a gradient acquiring section 32, a target inter-vehicle distance setting section 33, a rate limiter 34, a travel control section 35, a limit inter-vehicle distance setting section 36, and an inter-vehicle distance selecting section 37.

In the second modification, the gradient acquiring section 32 outputs a gradient without using a slope level, for example, as in the above-mentioned first modification.

Further, the target inter-vehicle distance setting section 33 selects any one of the target inter-vehicle distances for a plurality of target inter-vehicle distance characteristics, which are calculated by the target inter-vehicle distance calculating section 31, in accordance with the selection instruction for the target inter-vehicle distance that is output from the input unit 12. Then, the target inter-vehicle distance setting section 33 outputs the selected target inter-vehicle distance as a target inter-vehicle distance.

For example, the limit inter-vehicle distance setting section 36 set weightings, which correspond to the gradients acquired by the gradient acquiring section 32, for two target inter-vehicle distances, that is, the maximum target inter-vehicle distance (that is, a long set value DL corresponding to the third target inter-vehicle distance characteristic) and the minimum target inter-vehicle distance (that is, a short set value DS corresponding to the first target inter-vehicle distance characteristic) of the target inter-vehicle distances for the plurality of target inter-vehicle distance characteristics, which are calculated by the target inter-vehicle distance calculating section 31, in accordance with the gradients (that is, slope level) that are acquired by the gradient acquiring section 32. Further, an average weighting for the maximum target inter-vehicle distance and the minimum target inter-vehicle distance is calculated in accordance with the weightings, and this calculation result is set as a limit inter-vehicle distance.

For example, if the absolute value of the gradient acquired by the gradient acquiring section 32 is greater than or equal to a predetermined first gradient value Ga % (for example, 12%), the limit inter-vehicle distance setting section 36 sets a weighting for the maximum target inter-vehicle distance (that is, long set value DL) to 1.0 as shown in the following Table 4. Further, if the absolute value of the gradient acquired by the gradient acquiring section 32 is greater than 0% (for example, 6%) and is less than the predetermined first gradient value Ga %, the limit inter-vehicle distance setting section 36 sets a weighting for the maximum target inter-vehicle distance (that is, long set value DL) to a value that is greater than 0 and is less than 1.0. Furthermore, if the absolute value of the gradient acquired by the gradient acquiring section 32 is 0%, the limit inter-vehicle distance setting section 36 sets a weighting for the maximum target inter-vehicle distance (that is, long set value DL) to zero.

TABLE 4

| gradient (absolute value) | weighting (long set value DL) |
|---|---|
| Ga % or more | 1.0 |
| greater than 0% and less than Ga % | greater than 0 and less than 1.0 |
| 0% | 0 |

The inter-vehicle distance selecting section 37 selects the greater of a target inter-vehicle distance that is set in accordance with the operation input of an operator by the target inter-vehicle distance setting section 33 and a limit inter-vehicle distance that is set by the limit inter-vehicle distance setting section 36, and outputs the selected inter-vehicle distance as a target inter-vehicle distance.

Figure 9:
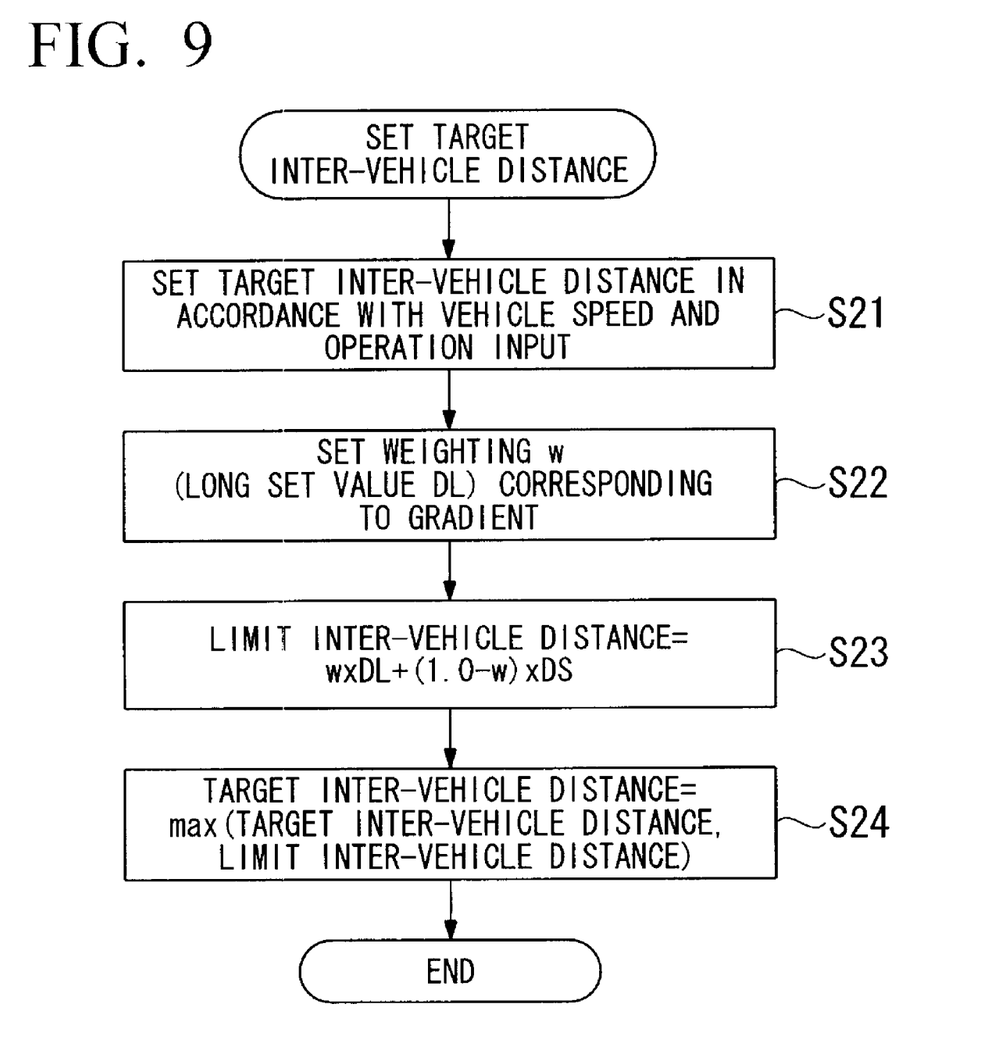
FIG. 9 is a flowchart illustrating an operation of the vehicular travel control device according to the second modification, particularly, processing for setting a target inter-vehicle distance.

According to processing for setting a target inter-vehicle distance of the second modification, first, for example, in Step S21 illustrated in FIG. 9, any one of the target inter-vehicle distances for a plurality of target inter-vehicle distance characteristics is set as a target inter-vehicle distance in accordance with a vehicle speed and the operation input of an operator.

Then, in Step S22, a weighting w for the long set value DL is set in accordance with the gradient of the road of travel.

After that, in Step S23, an average weighting for the long set value DL and the short set value DS is set as a limit inter-vehicle distance.

Subsequently, in Step S24, the greater of a target inter-vehicle distance, that is set in accordance with the vehicle speed and the operation input of an operator, and a limit inter-vehicle distance is selected and set as a target inter-vehicle distance. Then, the procedure proceeds to an end.

According to the second modification, it may be possible to set a target inter-vehicle distance that continuously changes between the maximum target inter-vehicle distance (a long set value DL corresponding to the third target inter-vehicle distance characteristic) and the minimum target inter-vehicle distance (a short set value DS corresponding to the first target inter-vehicle distance characteristic) of the target inter-vehicle distances for the plurality of target inter-vehicle distance characteristics. Accordingly, it may be possible to appropriately set a target inter-vehicle distance in a range where a driver does not feel uneasy, in accordance with the driver's sense about an inter-vehicle distance that changes due to the gradient of the road of travel.

Meanwhile, in the above-mentioned embodiment, any one of the target inter-vehicle distances for a plurality of target inter-vehicle distance characteristics, which are calculated by the target inter-vehicle distance calculating section 31, has been selected as the shortest inter-vehicle distance in accordance with the gradient. The present invention is not limited thereto. For example, as a third modification shown in FIG. 10, the target inter-vehicle distance, which is selected from target inter-vehicle distances for a plurality of target inter-vehicle distance characteristics in accordance with the operation input of an operator, may be corrected by a correction amount of an inter-vehicle distance that continuously changes (that is, may be lengthened by the correction amount of an inter-vehicle distance) in accordance with the gradient.

Figure 10:
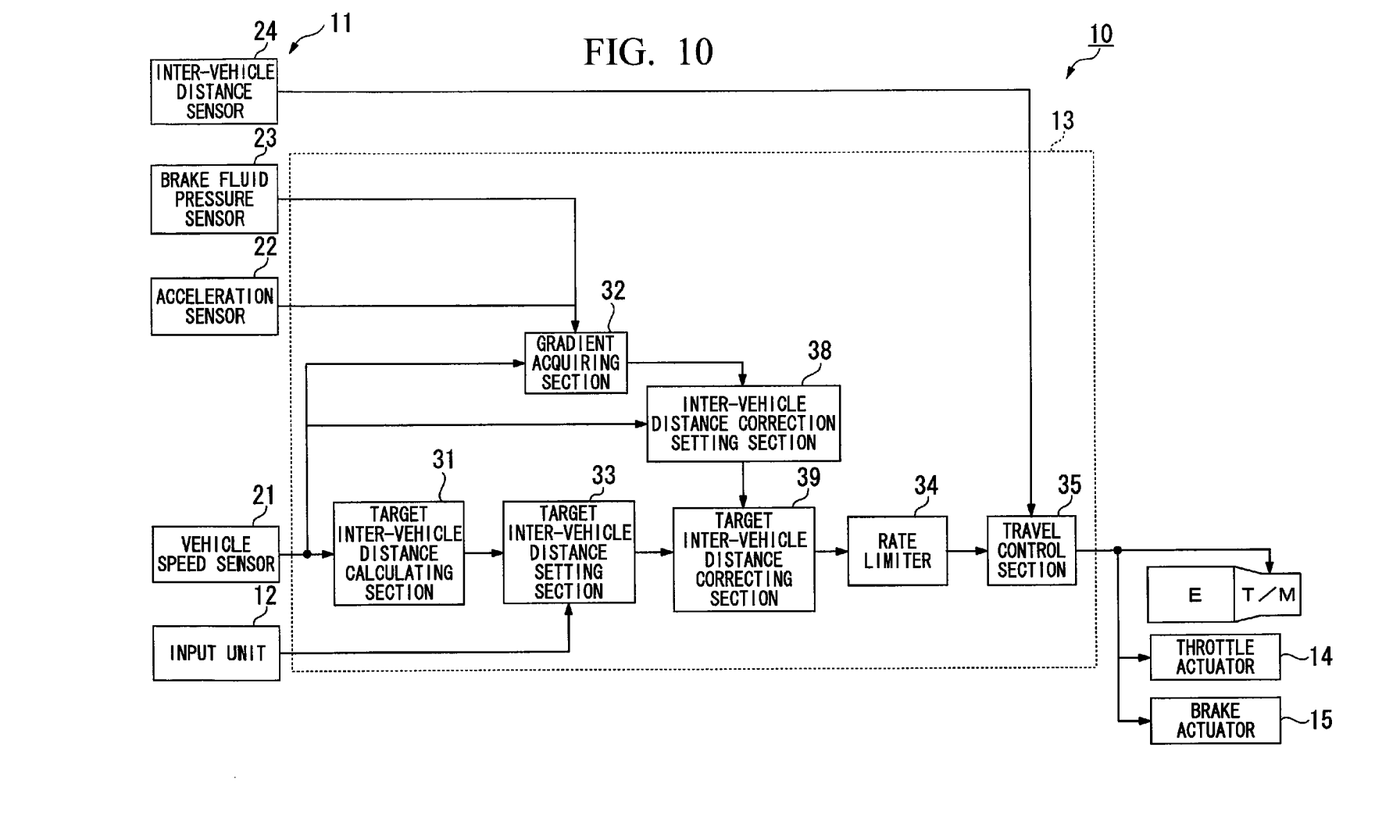
FIG. 10 is a block diagram of a vehicular travel control device according to a third modification of the embodiment.

In the third modification, the control unit 13 includes, for example, a target inter-vehicle distance calculating section 31, a gradient acquiring section 32, a target inter-vehicle distance setting section 33, a rate limiter 34, a travel control section 35, an inter-vehicle distance correction setting section 38, and a target inter-vehicle distance correcting section 39.

In the third modification, the gradient acquiring section 32 outputs a gradient without using a slope level, for example, as in the above-mentioned first modification.

Further, the target inter-vehicle distance setting section 33 selects any one of the target inter-vehicle distances for a plurality of target inter-vehicle distance characteristics, which are calculated by the target inter-vehicle distance calculating section 31, in accordance with the selection instruction for the target inter-vehicle distance that is output from the input unit 12. Then, the target inter-vehicle distance setting section 33 outputs the selected target inter-vehicle distance as a target inter-vehicle distance.

Figure 11:
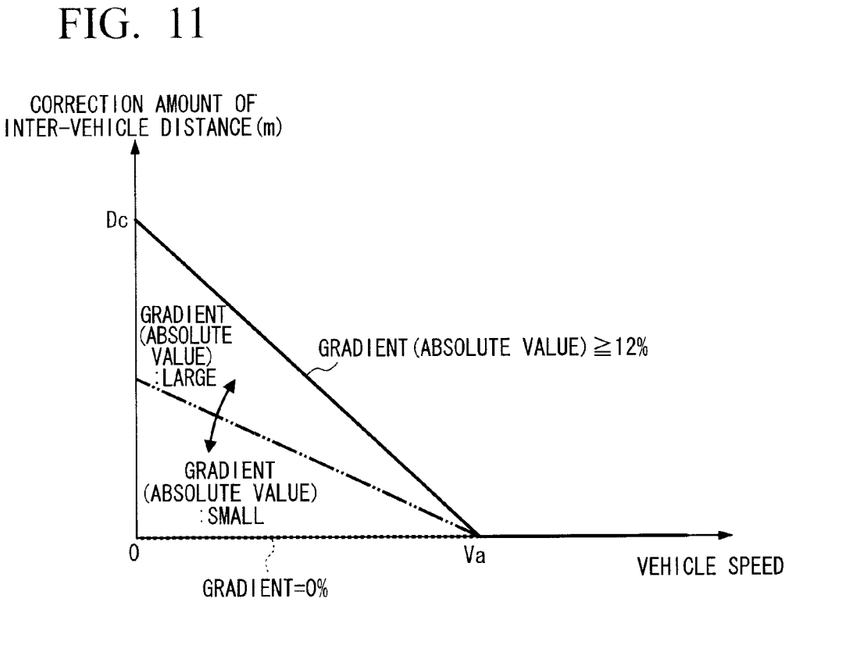
FIG. 11 is a graph showing a relationship between a correction amount of inter-vehicle distances and vehicle speeds for gradients of the third modification.

For example, as shown in FIG. 11, the inter-vehicle distance correction setting section 38 acquires the vehicle speed that is measured by the vehicle speed sensor 21 and a correction amount of the inter-vehicle distance that corresponds to the gradient acquired by the gradient acquiring section 32, with reference to a predetermined map or the like.

For example, if the gradient is not zero in a predetermined map shown in FIG. 11, the correction amount of the inter-vehicle distance is set to increase from zero as the vehicle speed decreases from a predetermined vehicle speed Va (for example, 40 km/h). The degree of the increase of the correction amount of an inter-vehicle distance, which accompanies with the decrease of the vehicle speed, is changed to have a tendency to increase as the absolute value of the gradient increases. Further, if the absolute value of the gradient is greater than or equal to a predetermined first gradient value Ga % (for example, 12%), the correction amount of the inter-vehicle distance corresponding to the vehicle speed becomes the maximum and the correction amount of an inter-vehicle distance is set to increase from zero up to the maximum correction amount Dc (for example, 1.5 m) as a vehicle speed decreases toward zero from a predetermined vehicle speed Va (for example, 40 km/h).

Figure 12:
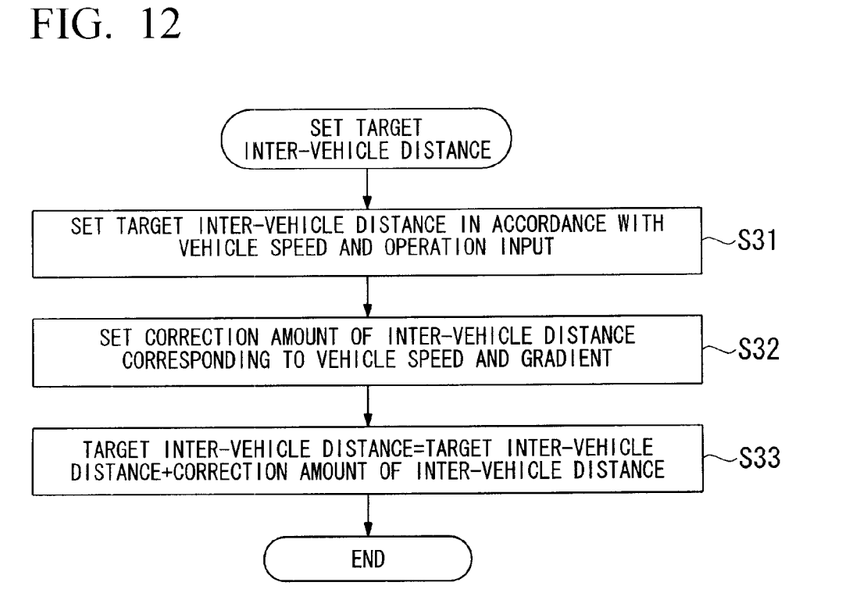
FIG. 12 is a flowchart illustrating an operation of the vehicular travel control device according to the third modification, particularly, processing for setting a target inter-vehicle distance.

According to the processing for setting a target inter-vehicle distance of the third modification, first, for example, in Step S31 illustrated in FIG. 12, any one of the target inter-vehicle distances for a plurality of target inter-vehicle distance characteristics is set as the target inter-vehicle distance in accordance with the vehicle speed and the operation input of an operator.

Then, the correction amount of an inter-vehicle distance, which corresponds to the vehicle speed and the gradient of the road of travel, is set in Step S32.

Subsequently, in Step S33, a value obtained by correcting the target inter-vehicle distance, which is set in accordance with the vehicle speed and the operation input of an operator, by the correction amount of an inter-vehicle distance is set as a new target inter-vehicle distance. Then, the procedure proceeds to an end.

According to the third modification, it may be possible to appropriately set a target inter-vehicle distance in accordance with the driver's sense about the inter-vehicle distance that changes due to a vehicle speed, in addition to the gradient of the road of travel.

Meanwhile, in the third modification of the above-mentioned embodiment, the correction amount of the inter-vehicle distance has been set in accordance with the vehicle speed and the gradient of the road of travel. The present invention is not limited thereto. For example, the correction amount of an inter-vehicle distance may be set in accordance with not the vehicle speed but the gradient of the road of travel.

Figure 13:
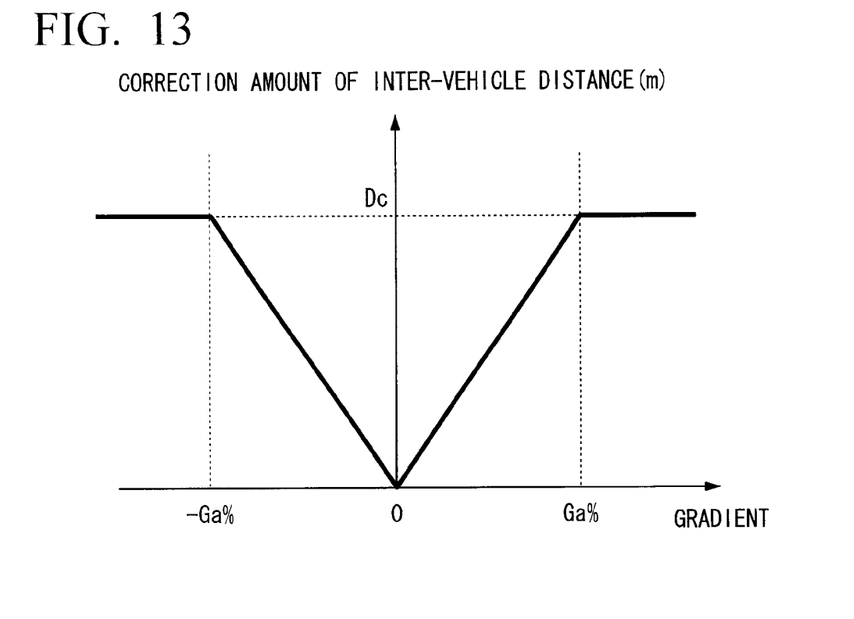
FIG. 13 is a graph showing a relationship between a correction amount of an inter-vehicle distance and a gradient of a fourth modification of the embodiment.

In a fourth modification, the inter-vehicle distance correction setting section 38 acquires the correction amount of an inter-vehicle distance, which corresponds to the gradient acquired by the gradient acquiring section 32, with reference to a predetermined map as shown in, for example, FIG. 13.

For example, in the predetermined map shown in FIG. 13, the correction amount of the inter-vehicle distance is set to tend to increase from zero up to the maximum correction amount Dc (for example, 1.5 m) as the absolute value of a gradient increases from zero up to a predetermined first gradient value Ga % (for example, 12%), and the correction amount of the inter-vehicle distance is set to become the maximum correction amount Dc (for example, 1.5 m) if the absolute value of a gradient is greater than or equal to a first gradient value Ga % (for example, 12%).

Figure 14:
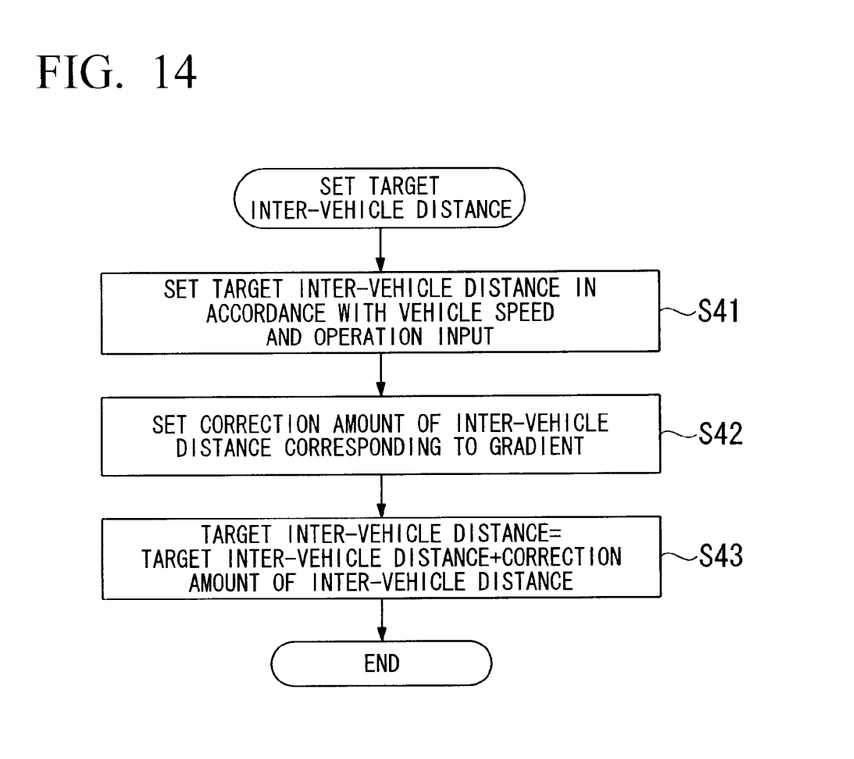
FIG. 14 is a flowchart illustrating an operation of the vehicular travel control device according to the fourth modification, particularly, processing for setting a target inter-vehicle distance.

According to processing for setting a target inter-vehicle distance of the fourth modification, first, for example, in Step S41 illustrated in FIG. 14, any one of the target inter-vehicle distances for a plurality of target inter-vehicle distance characteristics is set as the target inter-vehicle distance in accordance with the vehicle speed and the operation input of an operator.

Then, the correction amount of an inter-vehicle distance, which corresponds to the gradient of the road of travel, is set in Step S42.

Subsequently, in Step S43, a value obtained by correcting a target inter-vehicle distance, which is set in accordance with the vehicle speed and the operation input of an operator, by the correction amount of an inter-vehicle distance is set as a new target inter-vehicle distance. Then, the procedure proceeds to an end.

Meanwhile, in the third and fourth modifications of the above-mentioned embodiment, a single correction amount of an inter-vehicle distance has been set regardless of the operation input of an operator for a target inter-vehicle distance, which is set in accordance with the operation input of an operator by the target inter-vehicle distance setting section 33. The present invention is not limited thereto. A plurality of correction amounts of an inter-vehicle distance corresponding to the operation input of an operator may be set, and the correction amount of an inter-vehicle distance, which is selected from a plurality of correction amounts of an inter-vehicle distance, may be switched in accordance with the selection instruction for the target inter-vehicle distance that is output from the input unit 12.

For example, when a short set value DS corresponding to a first target inter-vehicle distance characteristic, an intermediate set value DM corresponding to a second target inter-vehicle distance characteristic, or a long set value DL corresponding to a third target inter-vehicle distance characteristic may be selected as a target inter-vehicle distance in accordance with the operation input of an operator, the correction amount of a short inter-vehicle distance is set for the short set value DS, the correction amount of an intermediate inter-vehicle distance is set for the intermediate set value DM, and the correction amount of a long inter-vehicle distance is set for the long set value DL. The maximum correction amounts Dc (that is, the correction amount of an inter-vehicle distance at the time of the stopping of a vehicle) of the correction amount of the short inter-vehicle distance, the correction amount of an intermediate inter-vehicle distance, and the correction amount of the long inter-vehicle distance are, for example, 1.5 m, 1.0 m, and 0.5 m, respectively.

While a preferred embodiment of the invention has been described and illustrated above, it should be understood that this is an exemplary of the invention and is not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:
1. A vehicular travel control device comprising:
an inter-vehicle distance measuring section that is mounted on a subject vehicle and measures an inter-vehicle distance between the subject vehicle and a preceding vehicle;
a gradient acquiring section that acquires a gradient of a road being traveled of the subject vehicle and outputs a gradient signal;
a vehicle speed sensor that measures a travel speed of the subject vehicle and outputs a vehicle speed signal;
a target inter-vehicle distance calculating section that receives the gradient signal output from the gradient acquiring section and the vehicle speed signal output by the vehicle speed sensor, and calculates target inter- vehicle distances for target inter-vehicle distance characteristics based on the gradient signal and the vehicle speed signal;

an inter-vehicle distance setting section that sets a set value of an inter-vehicle distance based on an operation of an operator, the set value of an inter-vehicle distance being configured to be selected from the target inter-vehicle distances by the operator;

a limit inter-vehicle distance setting section that sets weighting for a long set value and a short set value based on the gradient signal, and sets an average weighting for the long set value and the short set value in accordance with the weightings as a limit inter-vehicle distance, the long set value and the short set value being selectable by the operator from the target inter-vehicle distances;

an inter-vehicle distance selecting section sets a greater of the set value of an inter-vehicle distance and the limit inter-vehicle distance as a new target inter-vehicle distance; and a following travel control section that performs a travel control so as to make the inter-vehicle distance become equal to the new target inter-vehicle distance and stops the subject vehicle while following a stopping of the preceding vehicle.

2. The vehicular travel control device according to claim 1, further comprising an inter-vehicle distance correcting section that sets a correction amount of an inter-vehicle distance and outputs a correction amount, wherein the inter-vehicle distance setting section sets a value, which is obtained by adding the correction amount to the set value selected by the operator, as the set value of the inter-vehicle distance.

3. The vehicular travel control device according to claim 2, wherein the inter-vehicle distance correcting section sets the correction amount based on the gradient signal and the travel speed signal.

4. A vehicular travel control method, comprising the steps of:

measuring, by a sensor, an inter-vehicle distance between a subject vehicle and a preceding vehicle;

measuring, by a sensor, a travel speed of the subject vehicle;

acquiring, by a control unit, a gradient of a road being traveled of the subject vehicle;

setting, by the control unit, a target inter-vehicle distance based on the gradient and the travel speed;

calculating, by the control unit, target inter-vehicle distances for target inter-vehicle distance characteristics based on the gradient and the travel speed;

setting, by the control unit, a set value of an inter-vehicle distance based on an operation of an operator, the set value being configured to be selected from the target inter-vehicle distances by the operator;

setting, by the control unit, weighting for a long set value and a short set value based on the gradient signal, and setting an average weighting for the long set value and the short set value in accordance with the weightings as a limit inter-vehicle distance, the long set value and the short set value being selectable by the operator from the target inter-vehicle distances;

setting, by the control unit, the greater of the set value of an inter-vehicle distance and the limit inter-vehicle distance as a new target inter-vehicle distance; and performing, by the control unit, a travel control so as to make the inter-vehicle distance become equal to the target inter-vehicle distance and stop the subject vehicle while following a stopping of the preceding vehicle.

5. The vehicular travel control method according to claim 4, further comprising the step of setting, by the control unit, a correction amount of an inter-vehicle distance, wherein in the step of setting the set value of the inter-vehicle distance, the set value of the inter-vehicle distance is set by adding the correction amount to the set value selected by the operator.

6. The vehicular travel control method according to claim 5, wherein in the step of setting the correction amount, the correction amount is set based on the gradient and the travel speed.

* * * * *